Aug. 17, 1965   H. C. EMERSON ETAL   3,200,478
METHOD OF FORMING AND SEALING JOINTS IN METALLIC TUBING
Filed April 30, 1962   2 Sheets-Sheet 1

INVENTORS.
H. C. EMERSON
G. C. CADWELL
BY
George E. Pearson
ATTORNEY

Aug. 17, 1965  H. C. EMERSON ETAL  3,200,478
METHOD OF FORMING AND SEALING JOINTS IN METALLIC TUBING
Filed April 30, 1962                                    2 Sheets-Sheet 2

INVENTORS.
H. C. EMERSON
G. C. CADWELL
BY
George E. Pearson
ATTORNEY

United States Patent Office 3,200,478
Patented Aug. 17, 1965

3,200,478
METHOD OF FORMING AND SEALING JOINTS IN METALLIC TUBING
Herff C. Emerson, Chula Vista, and Gilbert C. Cadwell, San Diego, Calif., assignors to Rohr Corporation, Chula Vista, Calif., a corporation of California
Filed Apr. 30, 1962, Ser. No. 191,080
5 Claims. (Cl. 29—157)

This invention relates generally to methods mechanically joining lengths of metallic tubing and more particularly to new and improved methods of forming and sealing such mechanical joints.

In accordance with prior art constructions, as exemplified by the "Marman" type coupling disclosed in Patent Number 2,756,079, it is the usual practice to weld, braze, or otherwise respectively secure, machined flanges to the ends of tube sections which are to be joined mechanically. In this arrangement, a packing washer or similar suitable seal is disposed between the confronting end faces of the flanges. These end faces are then urged toward each other to compress the washer yieldably therebetween. This is accomplished by means of the "Marman" type clamp which coacts in wedging engagement with tapered surfaces on the flanges to convert radially directed clamping forces to axial forces which urge the tube sections and their flanges toward each other.

In another prior art construction, as exemplified by the "Connoseal" type of mechanical connection and seal between tube sections, the confronting machined flanges form a pocket in which is disposed a generally disc-shaped conical metallic washer, the action being such that as the flanges are moved axially toward each other in response to the radially directed clamping forces, as before, the inner and outer peripheral edges of the washer bite respectively into engaging surfaces of the confronting flanges, thereby to effect the seal therebetween.

Although the prior art structures are generally satisfactory in providing mechanical joints having the requisite sealing and structural integrity, the factory processes involved in the fabrication, such as in the machining and welding of the flanges, necessarily entails labor limitations of time, costs, and procedures, and the resulting structure is inordinately massive and heavy. For these reasons, the prior art structures do not lend themselves to the on-site forming or repair of tubing systems as, for example, in the use of such tubing systems in space or in aerospace applications.

In accordance with the present invention for forming and sealing mechanical joints in thin walled tubing, the ends of the tubing to be joined are expanded, offset, flared, flanged, or otherwise suitably formed, by the application thereto of high energy forces of explosive nature sufficient to produce shock wave forming of the tubing materials employed. The shock wave energy so applied may be derived from the use of chemical or gaseous explosives, or by electrical discharge through fluids or metals, and the energy so applied being so directed as to shape the expanded tubing wall into the configuration of high energy forming dies. The high energy formed tubing ends are then moved toward each other end to end such that flanged and offset portions thereof respectively engage the ends of a sealing ring which is of annular configuration and arcuate in longitudinal section, parallel to the axis of the tube sections being joined. Suitably flanged or flared surfaces of the high energy formed tubing ends are then engaged by a "Marman" type clamp to develop the ultimate axial forces for urging the tube sections toward each other, thereby to force the formed tubes into the ends of the sealing ring with great force to effect the seal therebetween. This seal, moreover, is enhanced by the configuration of the sealing ring. Thus, when pressure is applied internally of the joined tubing, it will act against the inside of the formed sealing ring thereby tending to expand the same to increase the sealing pressure at the ends of the ring.

An object of the present invention therefore is to provide new and improved methods of forming and sealing mechanical joints in tubing.

Another object is to provide a process for forming mechanical joints in tubing which lends itself to the on-site forming and repair of such joints.

Another object is to provide a method of forming and sealing mechanical joints in tubing which may be used in the on-site joining of tubing as in space applications and in the repair and modification of aerospace vehicles.

Still another object to provide a method of forming mechanical joints in tubing which utilizes formed ends of the tubing for this purpose.

Still another object is to provide a method of joining tubing in which radially directed clamping forces are utilized to effect a mechanical seal between formed and confronting ends of the tubing.

Still other objects, features and advantages of the present invention will become more fully understood as the description proceeds, reference being had to the accompanying drawings wherein.

Figure 3:
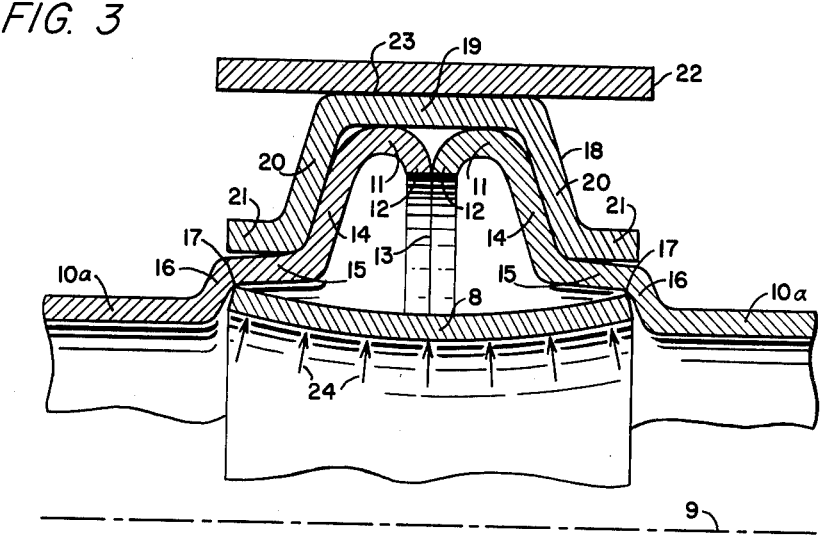
FIG. 3 is a longitudinal sectional view of the tube sections and coupling therebetween as seen along the lines 3—3 of FIG. 2 and constructed according to the preferred embodiment of the invention.

Referring now to the drawings, and first more particularly to FIG. 3, there is disclosed therein a pair of tube sections 10a which are coaxially aligned with respect to their common center line 9 and disposed end to end. The end portions of these tubes are formed identically, each being expanded radially into the configuration presently to be described.

The expanded terminal end portion of each tube section 10a is generally semicircular in longitudinal cross section as indicated at 11. The resulting radially inwardly directed ends 12 of the tubes thus provide great strength and rigidity to the annular terminal end portions 11 of the tube sections while also providing mutually engaging and abutting end faces which meet as indicated at 13 at the limit of axial movement of the tube sections 10a toward each other.

The annular terminal portions 11 are continuations of flared portions 14 which lie along lines which, if extended, would meet and constitute an inverted V. Flared portions 14, in turn, are continuations of expanded tube wall portions 15 which extend generally parallel to the main tube walls of the tube sections 10a. The expanded wall portions 15, in turn, are continuations of initial or base flared portions 16 which continue directly from the main walls per se. The flared portions 16, like flared portions 14, are directed along lines which, if extended, would meet and constitute an inverted V, this being for a purpose subsequently to appear.

The inner surfaces of flared portions 16 constitute offsets or shoulders for engagement with the ends respectively of a sealing ring 8. Sealing ring 8 is characterized by being annular as the term "ring" implies and is further characterized in that the ring is of concavely arcuate configuration as viewed in its longitudinal section taken parallel to the common axis 9 of the tube sections 10a. As a result of the tapered inner surfaces of flared portions 16, the ends of sealing ring 8 make virtual line contact therewith as depicted at 17.

Before becoming engaged by tube sections 10a along the peripheral or circumferential lines 17, sealing ring 8 may be considered to be "free floating" and hence, will not necessarily have its central axis coincide with the common axis 9 of the tube sections 10a as the same are moved toward each other coaxially to engage the sealing ring. To this end, the expanded tubular wall portions 15 serve to guide the sealing ring into the ultimate line contact 17 with the inner surfaces of the flanged or flared portions 16.

The outer tapered surfaces of the flanged or flared portions 14 serve to convert radially directed clamping forces applied thereto into axially directed forces for moving the tube sections 10a toward each other. This is accomplished by means of the "Marman" type clamping ring disclosed which comprises a plurality of circumferentially spaced channel members 18. Each member 18, in cross section, has a generally inverted U configuration wherein the substantially flat or longitudinally extending base 19 either symmetrically engages the outer surfaces of the annular terminal portions 11 of the formed tube sections or is equispaced therefrom, wherein the inner tapered surfaces of the legs 20 of the channel member engage the outer surfaces of flanged portions 14 of the tube sections in matching engagement therewith, and wherein the channel legs 20 terminate in generally axially extending flange portions 21 which provide the channel member 18 with the requisite rigidity to effect the radial-to-axial force conversion, as aforedescribed. The inner surfaces of the flanges 21 may also move to seat on the confronting outer surfaces of the expanded tubular wall portions 15 at the end limit of inward radial movement of the channeled clamping segments 18. This radial inward movement of the clamping sections is accomplished by means of the clamping band 22 to which the segments may be secured, as by spotwelding, not shown but distributed peripherally about the engaging surfaces as at 23.

When the band 22 is tightened circumferentially, in a manner and by the means presently to be described, this causes the segments 18 to be moved inward radially and this results in a relative sliding and wedging action between the matched and engaging surfaces of flared portions 14 of the tube sections and the legs 20 of channel members 18. This, in turn, causes the tube sections to be moved axially toward each other. When this occurs, the virtual knife edges of the ends of sealing ring 8 extending respectively along the lines of contact 17 bite with great force into the flared portions 16 of the tube section, thereby to effect a sealed connection therebetween.

As an end limit to the radial inward movement of segments 18, flanges 21 thereof will seat fully upon the outer surfaces of tubular wall portions 15, and base 19 of the segments 18 will move to engage annular portions 11 of the tube sections. As an end limit of the coaxial movement of the tube sections toward each other, the terminal portions 11 of the same will become engaged in their end faces, as at 13. As a result of these engaging movements, sealing ring 8 may yield, that is, buckle inwardly at its longitudinal center, thereby to assure continued engagement of its knife edges with the flared walls of the tube section. As a result of the limited movements of the tube sections relative to each other and of the segments 18 relative to the tube sections, however, the clamping structure afforded thereby is interlocked and substantially unyielding and rigid to thus maintain a continued balance with the reacting forces applied thereto by the sealing ring. The sealing ring 8, moreover, will have internal fluid pressures applied thereto as indicated by the arrows 24 with the result that, in service, these pressures will act against the inner surface of the stressed sealing ring tending further to expand the same longitudinally and thereby increase the sealing pressure on the tube sections.

Figure 4:
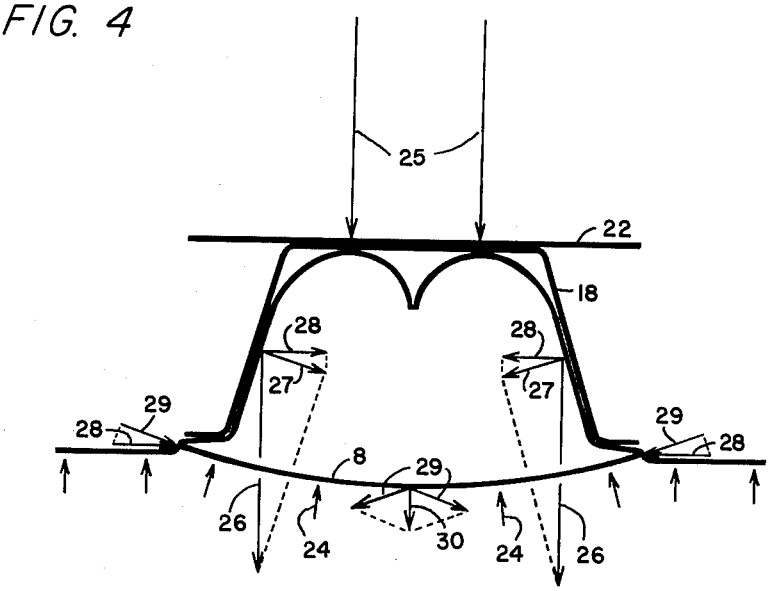
FIG. 4 is a view similar to that of FIG. 1a and disclosing in schematic form the mechanical joint structure of FIG. 3 and the vector forces involved in effecting the seal afforded thereby.

The dynamic balance of the forces involved in the coupling structure of FIG. 3 is depicted vectorially in the schematic showing of FIG. 4 wherein it will be seen that the uniform application of the inwardly directed radial clamping forces are designated by the vectors 25. These forces appear as forces 26 on the matched and engaging surfaces of the tube sections and channel segments 18. These forces, in turn, produce forces 27 normal to the matched and engaging surfaces, and forces 27, in turn, produce forces 28 which act coaxially on the tube sections to move the same together.

Forces 28 are also depicted in the region of the knife edges 17 of sealing ring 8, and these forces produce forces 29 which are tangent to the arc of curvature of the sealing ring at their knife edges. These forces are further shown at the longitudinal center of the sealing ring where they combine to produce a resultant force 30 which tends to buckle the sealing ring inwardly. Of course, the actual spring-back forces inherent in the sealing ring oppose or counteract forces 29 and 30, as do the fluid pressure forces 24, to thus maintain the seal in dynamic balance and to impart structural and sealing integrity to the mechanical coupling thus afforded by the structure and the counteracting forces.

Figure 2:
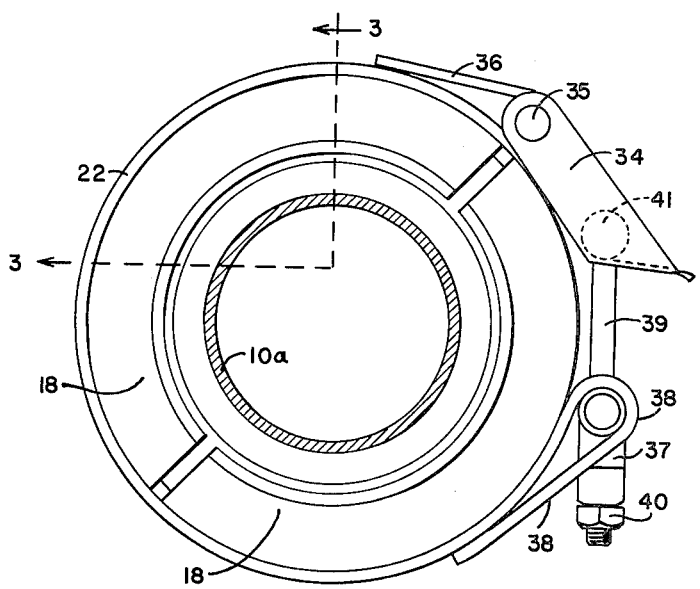
FIG. 2 is a transverse sectional view of a section of tubing which is mechanically joined, as by the mechanical joint of the present invention, to another section of tubing.

The "Marman" type clamp comprising segments 18 and clamping band 22 may generally be of the type disclosed in the aforesaid Patent Number 2,756,079, and reference may be had thereto for further details of construction and operation of such a clamp. It suffices herein, however, merely to state with reference to FIG. 2, that segments 18 may be two in number and that band 22 is looped at its ends for attachment to suitable means for developing loop tension in the band. This means, as disclosed, may comprise a conventional quick coupler take-up latching connection including a latch 34 pivotally connected by a pintle 35 to the loop 36 at one end of the band. A tubular T-trunnion 37 is pivotally mounted in a loop 38 at the other end of the band, and a T-bolt including a shank 39 is extended through T-trunnion 37 and threaded at the end to receive a nut 40, the nut being engaged by the trunnion such that it draws the bolt therethrough upon being tightened. Shank 39 also has a T-head 41 which is releasably engageable by latch 34, and the arrangement is such that hoop tension in band is developed by advancing nut 40 on bolt shank 39 so as to apply pressure through T-trunnion 37 to loop 38 at one end of the band while the other end of the band is anchored by the latch 34.

Figure 1:
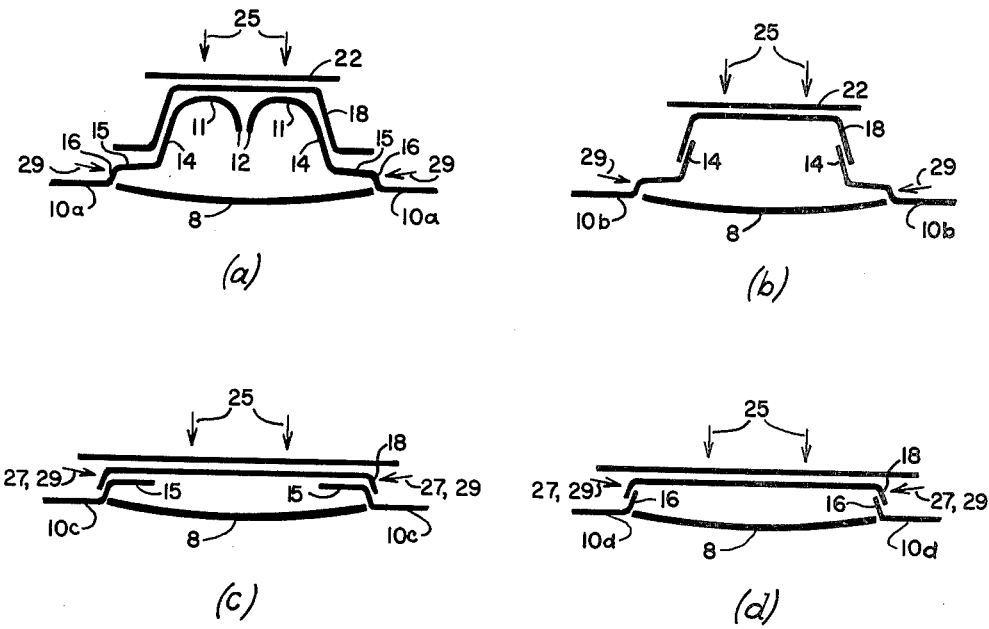
FIG. 1 is a view depicting in diagrammatic form alternative mechanical joint configurations by which the joining and sealing method and principles of the present invention may be practiced.

Referring now to FIG. 1, it will be seen that the preferred coupling structure as depicted in FIG. 1a may be modified as in FIGS. 1b to 1d to provide varying degrees of utility while still operating within the scope of the inventive concept and principles of the present invention. Thus, referring first to FIG. 1d, it will be seen that the tube sections 10d have end portions formed only to the extent of providing the initial flared portions 16 of FIG. 1a. In this simple flared arrangement, the clamping segments 18d are applied directly to the outer tapered surfaces of flared portions 16 and the radial forces 25 produce combined forces 27, 29 which act substantially directly into the ends of sealing ring 8 to thus provide a substantially simplified coupling structure.

In the expanded wall arrangement of FIG. 1c, the coupling structure and action is generally similar to that of FIG. 1d with the exception that tube sections 10c terminate in the expanded wall portions 15 of FIG. 1a. The construction of FIG. 1c thus provides all of the utility and advantages of FIG. 1d while, in addition, providing the guiding feature afforded by the expanded wall portions 15 in assuring the axial alignment of the sealing ring 8 with the coaxial alignment of the tube sections 10c.

The compound flare arrangement of FIG. 1b is essentially that of FIG. 1a with the exception that the tube sections 10b terminate in their formed end portions with the flared or flanged portions 14 of FIG. 1a. As a result, the joint construction of FIG. 1b will not have the structural rigidity of that of FIG. 1a but will provide a quality of yieldability in the regions of the formed end portions of the tube sections 10b to thus extend the limit of radial inward movement of the clamping sections or segments 13 which may be desirable under certain service conditions.

By way of summary, and with reference to FIG. 1, it will be seen that in any of the several forms disclosed therein, that the formed tube end portions of the confronting tube sections present offset or shouldered surfaces for biting engagement by the knife-edge ends of the sealing ring, and further provide external surfaces for camming or wedging reaction with a "Marman" type clamping ring to the end that the radially directed clamping forces developed thereby produce coaxially directed forces for urging the confronting ends of the tube sections into biting and sealing engagement with the sealing ring. In any of the several forms disclosed, the sealing ring is interposed between the tube sections, after which the "Marman" clamp is applied forcibly thereto to engage and seal the ends of the sealing ring therewith.

The expanded tube ends, whether simply flared, offset and expanded, compound flared with an intervening expanded wall portion, or terminated in a flare and/or annular flange, in contrast with the massive and heavy machined flanges of the prior art devices, provide a light weight structure and additionally afford all of the functions, features and advantages, such as sealing and structural integrity, of the more rugged machined flanges. In practice, for example, it is thus possible to make an expanded mechanical tubing joint in accordance with the teachings of the present invention, as herebefore described, which will hold upwards of 70% of the pressure required to burst the tubing per se. The expanded tube ends, moreover, may be given formed configurations which may be caused to yield under controlled conditions when this is desired.

The expanded tubing, in the various configurations herein disclosed, may be formed in any known manner to provide the coupling structure as herein disclosed, but it is a particular feature and object of the present invention as it resides in the method of forming the coupling joint, to expand and form the tube ends by high energy explosive means capable of generating shock wave forces which may be directed to move the tube wall into conforming engagement with the surface of an enclosing forming die. It is thus possible, in the use of such high energy forming methods and means, to successfully flare, bead, flange, and otherwise deform such difficult-to-form materials such as AM350 stainless steels, Hasteloy "X," Incoloy 901 and René 41 materials.

The "so called" electrical discharge methods of forming metals in conductive water are well suited for forming the expanded tube ends of the present invention. Exemplary of such a method and apparatus is that disclosed and claimed in the copending application of Louis R. Padberg, Jr. for Electrical Discharge Method of and Apparatus for Generating Shock Waves in Water, Serial No. 43,580, filed July 18, 1960, and assigned to the assignee of the instant application.

It is a particular object and feature of the present invention, moreover, to form the tube end coupling configuration by high energy methods and means adapted for on-site application. It is frequently desirable, for example, to readily repair, modify or newly form the tubular joints and fittings in the high pressure hydraulic lines, or the like, such as may be employed in an aircraft, and to perform such operations on-site, and under emergency conditions, as in the aircraft itself. It becomes essential, furthermore, in keeping with the advances in space technology, to make provision for the repair and modification of the tubular equipment of space vehicles during orbital flight. Exemplary of the high energy forming methods and means particularly well suited to expand tubing for such purposes are hand held high energy tube expanding tools such as disclosed and claimed in the copending application of Gilbert C. Cadwell for High Energy Tube Expander, Serial No. 102,081, filed February 17, 1961, and assigned to the assignee of the instant application. Reference may be had to this application for details of construction and operation since it suffices for purposes herein merely to set forth the cardinal characteristics of such a hand held tool.

This tool generally comprises split dies which are placed on the end of a tube to be expanded, and further has provision for actuating a cartridge and releasing and porting the resulting hot pressure gases into a resilient boot which thus expands against the tube wall to force the same against the die surfaces. Porting of the hot pressure gases is critical, the ports being so constructed and arranged as to permit the expanding gas to arrive at the working area of the boot with negligible pressure loss and at minimum velocity, thereby to avoid concentrations of the pressure which will tend to destroy the boot. The pressure boot is formed of special material to contain the hot forming gases which may reach pressures as high as 45,000 p.s.i. in the smaller tools. The high energy charge of the cartridge is also a critical parameter, the proper weight and correct velocity powder being essential in order to produce optimum forming results. For example, in a tool which requires 16 grains of powder to form a part, a 15 grain charge will form a sub-standard part, but it will be of a higher quality than one formed by a 24 grain charge.

The tool, although cartridge actuated, allows no pressure to escape into the tubing, nor is there any residue or contamination introduced thereinto due to the forming operation. These features are attributable to the resilient boot which, in addition to serving as the energy transfer medium, as aforedescribed, also serves to contain the hot expanding gases and, to this end, the manner of sealing the resilient tubular construction of the boot to its supporting structure is a further critical parameter of the tool.

The hand held tool can form tubing of the order of ¼" O.D. to 4" O.D., and the thinning of the tubing as a result of the forming operation is a matter of only a few ten thousandths of an inch. The tool mass for tubing 4" O.D. and over becomes too great for one man to place in position, hold and fire, so it then becomes a bench tool or one which is mechanically located.

Hand held high energy tools of the aforedescribed type are therefore well adapted to form tubular fittings and joints such as may be required to add or repair systems in space and in aerospace applications wherein, for example, it may be required to transmit liquid oxygen in systems comprising 2" O.D. x .037 wall A286, 3" O.D. by .065 wall 6061 aluminum, 4" O.D. by .040 wall 17–7PH, and 8" O.D. by .081 walled 321 stainless steel tubing, and like applications and requirements.

By way of summary, applicants' invention, as it resides in the method of forming and sealing mechanical joints in tubing generally comprises the steps of so precisely forming the confronting ends of the tubes to be joined so as to provide opposed surfaces for respectively engaging the knife-edge ends of a tubular sealing ring of concavely arcuate longitudinal cross section and further providing flared or tapered surfaces, and radially directing clamping forces against said tapered surfaces as by a locking ring, thereby to derive from these radially directed forces, coaxially directed forces to urge the tubes axially toward each other and forcibly into biting engagement with the knife edges of the sealing ring.

From the foregoing, it should now be apparent that there has been provided methods and means of forming and sealing mechanical joints in tubing which are well adapted to fulfill the aforestated objects of the invention.

It will be understood, moreover, that this invention may be embodied in other forms or carried out in other ways without departing from the spirit or essential characteristics thereof. The disclosed embodiments of the invention are therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. The on-site method of forming, joining and sealing a pair of thin walled expandable metallic tube sections coaxially end to end comprising the steps of forming each of the confronting tube end portions by identically and precisely expanding the same with high energy and each with a yieldable annular flared portion having inner and outer flared surfaces, interposing between the inner flared surfaces a yieldable metallic tubular sealing ring of concavely arcuate cross section longitudinally of said tube sections, and applying a clamping ring directly to the outer flared surfaces of said tube sections and with coacting wedging action therewith to move said tube sections coaxially toward each other thereby forcibly to engage said inner flared surfaces in dynamically balanced sealing engagement with the ends of said sealing ring.

2. The on-site method of forming, joining and sealing a pair of thin walled expandable metallic tube sections coaxially end to end comprising the steps of forming each of the confronting tube end portions by identically and precisely expanding the same with high energy and each with a radial inwardly directed flange for abutment each with the other in the end limit of coaxial movement of said tube sections toward each other, each with a terminal yieldable annular flange of semicircular cross section thereby to afford strength in the terminal end portion of said sections, each with first and second yieldable annular flared portions, and each with an expanded wall portion interconnecting said flared portions, interposing within said expanded wall portions and between the inner flared surfaces of said second flared portions a yieldable metallic sealing ring of concavely arcuate cross section longitudinally, applying a clamping member directly to the outer surfaces of said first flared portions with a wedging action thereon to move said tube sections coaxially toward each other and toward the ends of said sealing ring as the same moves in guided coaxial relation within said expanded tubular wall portions thereby forcibly to urge said inner flared surfaces yieldably against the ends of the dynamically balanced sealing ring in sealing engagement therewith.

3. The method of on-site joining of contiguous lengths of thin walled expandable metallic tubing which comprises the steps of separately and identically expanding and flanging the tube end portions with high energy precisely against removable split die surfaces to form spaced shoulders and yieldable confronting terminal flanges when the tubes are aligned end to end, inserting a yieldable metallic sleeve of arcuate longitudinal cross section within the aligned and confronting end portions of the tubing with the ends of the sleeve respectively abutting said shoulders, and yieldably clamping said flanges together to urge said abutting shoulders and sleeve ends into yieldable engagement.

4. The method of on-site joining of lengths of thin walled expandable metallic tubing which comprises the steps of identically and precisely expanding and flanging each tube end portion to form a yieldable flared shoulder and a radially directed and yieldable end face therein, inserting a yieldable metallic sleeve of arcuate longitudinal cross section within the expanded tube end portions, moving the tube end portions together end to end to bring the end faces thereof into confronting relation and said shoulders thereof respectively into abutting engagement with the ends of said sleeve, and yieldably clamping said flanged end portions reactively and yieldably together to forcibly urge said abutting shoulders and sleeve ends together in a dynamic balance of the clamping and yieldably reacting forces.

5. The method as in claim 4, said shoulder and radial end face being formed concurrently by the release of explosive energy.

References Cited by the Examiner

UNITED STATES PATENTS

| | | | |
|---|---|---|---|
| 381,869 | 4/88 | Williams | 285—368 |
| 790,644 | 5/05 | Lloyd | 29—526 |
| 1,598,714 | 9/26 | Gray | 29—526 |
| 1,928,910 | 10/33 | Riemenschneider | 29—157 X |
| 2,271,425 | 1/42 | Harris | 285—367 |
| 2,303,114 | 11/42 | Egger | 285—336 |
| 2,761,707 | 9/56 | Herman | 285—367 |
| 2,769,648 | 11/56 | Herman | 285—366 |
| 2,834,087 | 5/58 | Herman | 285—367 |
| 3,120,259 | 2/64 | Orr | 29—421 X |
| 3,127,923 | 4/64 | Cadwell. | |

FOREIGN PATENTS

| | | |
|---|---|---|
| 869,453 | 3/53 | Germany. |
| 676,897 | 8/52 | Great Britain. |
| 766,741 | 1/57 | Great Britain. |

WHITMORE A. WILTZ, *Primary Examiner.*

CARL W. TOMLIN, *Examiner.*